United States Patent
Wan et al.

(10) Patent No.: US 9,083,407 B2
(45) Date of Patent: Jul. 14, 2015

(54) SYSTEMS AND METHODS FOR GENERATING A PRE-CODING CODE BOOK

(75) Inventors: Lei Wan, Beijing (CN); Pål Frenger, Linköping (SE); Qingyu Miao, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 13/121,953

(22) PCT Filed: Oct. 1, 2008

(86) PCT No.: PCT/SE2008/051105
§ 371 (c)(1),
(2), (4) Date: Mar. 31, 2011

(87) PCT Pub. No.: WO2010/039069
PCT Pub. Date: Apr. 8, 2010

(65) Prior Publication Data
US 2011/0188549 A1 Aug. 4, 2011

(51) Int. Cl.
*H04K 1/10* (2006.01)
*H04L 27/28* (2006.01)
*H04B 7/06* (2006.01)

(52) U.S. Cl.
CPC ............ *H04B 7/0615* (2013.01); *H04B 7/0665* (2013.01)

(58) Field of Classification Search
CPC .......................... H04B 7/0615; H04B 7/0665
USPC .......................... 375/260, 267, 295, 316, 324
See application file for complete search history.

(56) References Cited

U.S. PATENT DOCUMENTS

| | | |
|---|---|---|
| 7,649,831 B2 * | 1/2010 | Van Rensburg et al. ...... 370/203 |
| 2004/0266339 A1 | 12/2004 | Larsson |
| 2007/0281746 A1 | 12/2007 | Takano et al. |
| 2008/0165870 A1 | 7/2008 | Kent et al. |
| 2008/0175183 A1 | 7/2008 | Devroye et al. |
| 2008/0318520 A1 * | 12/2008 | Kwun et al. ....................... 455/7 |
| 2009/0143008 A1 * | 6/2009 | Hottinen et al. ............. 455/11.1 |
| 2009/0268827 A1 * | 10/2009 | Clerckx et al. ................ 375/260 |
| 2011/0222627 A1 * | 9/2011 | Prakash et al. ................ 375/295 |

FOREIGN PATENT DOCUMENTS

| | | |
|---|---|---|
| CN | 101505205 A | 8/2009 |
| JP | 2008178070 A | 7/2008 |

(Continued)

OTHER PUBLICATIONS

Cacopardi, S. et al. "A Frequency Division Duplex Configuration for Indoor Wireless Multicarrier DS-CDMA Systems." European Personal Mobile Communications Conference together with ITG-Fachtagung, Mobile Kommunikation, Nov. 28, 1995.

(Continued)

*Primary Examiner* — Freshteh N Aghdam
(74) *Attorney, Agent, or Firm* — Coats and Bennett, PLLC

(57) ABSTRACT

In a network comprising a signal forwarding node, a pre-coding code book generating method, wherein the method comprises: generating a pre-coding code book, wherein the pre-coding code book comprises at least one pre-coding code word corresponding to the signal forwarding node, and the pre-coding code word comprises one or more antenna beamforming weights; and communicating the pre-coding code book to a user equipment.

19 Claims, 9 Drawing Sheets

(56) References Cited

FOREIGN PATENT DOCUMENTS

WO   2009089289  A1   7/2009
WO   2009099151  A1   8/2009

OTHER PUBLICATIONS

Zhang, H. et al. "Asynchronous Interference Mitigation in Cooperative Base Station Systems." IEEE Transactions on Wireless Communications, vol. 7, No. 1, Jan. 2008.

3rd Generation Partnership Project, "Physical Channels and Modulation", Technical Specification Group Radio Access Network; Evolved Universal Terrestrial Radio Access (E-UTRA); Nov. 2011, 3GPP TS 36.211 V8.1.0 (Release 8).

3rd Generation Partnership Project, "Universal Terrestrial Radio Access (UTRA) repeater planning guidelines and system analysis", Technical Specification Group Radio Access Networks, Dec. 2004, 3GPP TR 25.956 V6.0.0 (Release 6).

* cited by examiner

SYSTEMS AND METHODS FOR GENERATING A PRE-CODING CODE BOOK

TECHNICAL FIELD

The present invention relates to systems and methods for generating a pre-coding code book for wireless communication systems with multiple transmit antennas.

BACKGROUND

Third Generation Partnership Project (3GPP) release 8, Evolved Universal Terrestrial Radio Access (EUTRA), also called long-term-evolution (LTE), supports different downlink multi-antenna modes. These modes include: (1) transmit diversity, (2) code book-based pre-coding for both single-user and multi-user spatial multiplexing, and (3) user equipment (UE) (a.k.a., a mobile terminal) specific reference signal assisted, single-rank, non-code book-based beam-forming.

In code book based pre-coding, the pre-coding code books at an eNodeB (eNB) are predetermined. In a non-code book based beam-forming mode, downlink transmitting weights may be determined in the eNB based on UE uplink signals (e.g., reference signals) or in the UE together with feedback of the downlink transmission weights from the UE to the eNB. An instantaneous eNB transmission weight is decided for each scheduled UE, either based on UE pre-coding matrix indicator (PMI) feedback or on a UE reference signal.

Wireless networks are increasingly employing multi-antenna solutions and/or signal forwarding nodes (e.g., repeaters, relays, etc.) to increase coverage area and/or user data rates. However, because an eNB's code book is predetermined and the non-code book method of determining beam-forming weights is UE-specific and dynamically varying, it is difficult to ensure an effective combination of signal forwarding nodes and multi-antenna schemes.

Accordingly, improved systems and methods are desired.

SUMMARY

In one aspect, the present invention provides a pre-coding code book method performed by a network node (e.g., a base station). In some embodiments, the method includes the steps of: (1) generating (e.g., creating and/or updating) a pre-coding code book, wherein the pre-coding code book comprises at least one pre-coding code word associated with a signal forwarding node, and the pre-coding code word comprises one or more antenna beam-forming weights; and (2) communicating, from the network node, the pre-coding code book to a user equipment. The method may further include optimizing the pre-coding code book using any one of a dirty-paper coding algorithm and sub-optimal pre-coding algorithm. The step of generating the pre-coding code book may include generating a pre-coding code word for the signal forwarding node and including the pre-coding code word in the pre-coding code book.

In some embodiments, the step of generating the pre-coding code word for the signal forwarding node comprises the steps of: (1) receiving at the network node a reference signal transmitted from the signal forwarding node, (2) measuring the reference signal, (3) determining antenna beam-forming weights based on measurements of the reference signal, (4) forming a pre-coding code word that comprises the determined antenna beam-forming weights, and (5) including the pre-coding code word in the pre-coding code book. In some embodiments, the method may also include the step of transmitting to the signal forwarding node a trigger message that causes the signal forwarding node to transmit the reference signal.

In some embodiments, the step of generating the pre-coding code book includes the steps of: (1) transmitting a reference signal to the signal forwarding node, wherein the signal forwarding node is configured to measure the reference signal, determine antenna beam-forming weights based on measurements of the reference signal, and transmit the determined antenna beam forming weights to the network node, (2) receiving the antenna beam forming weights from the signal forwarding node, and (3) adding to a pre-coding code book a pre-coding code word that comprises the received antenna beam-forming weights. In some embodiments, the step of receiving the antenna beam forming weights comprises receiving from the signal forwarding node a pre-coding code word that comprises the antenna beam-forming weights.

In some embodiments, the generating step is performed periodically and the network node sets the interval at which the determining step is performed. In other embodiments, the generating step is performed only during any one of a system initialization period and a new user set-up procedure.

In some embodiments the communicating step comprises communicating a pre-coding code book size to the user equipment using a common control channel and using candidate pre-coding vectors as weights of common reference signals.

In another aspect, the present invention relates to an improved base station. In some embodiments the base station includes: a pre-coding code book generating module configured to generate a pre-coding code book, wherein the pre-coding code book comprises at least one pre-coding code word associated with a signal forwarding node, and the pre-coding code word comprises one or more antenna beam-forming weights; and a pre-coding code book communicating module configured to communicate the pre-coding code book to a user equipment.

In some embodiments, the base station may further include: a reference signal transmitting module configured to transmit a reference signal to a signal forwarding node and a receiving module that is operable to receive from the signal forwarding node antenna beam-forming weights, wherein the pre-coding code book generating module is configured to add to a pre-coding code book antenna beam-forming weights received by the receiving module. In these embodiments, the base station may further include a pre-coding code word forming module configured to form a pre-coding code word comprising antenna beam-forming weights received by the receiving module, and the pre-coding code book generating module is configured to add to a pre-coding code book pre-coding code words formed by the pre-coding code word forming module.

In some embodiments, the base station may further include: (1) a trigger transmitting module configured to transmit a trigger to the signal forwarding node, wherein the trigger triggers the signal forwarding node to transmit a reference signal, (2) a measuring module configured to measure a reference signal transmitted by the signal forwarding node, (3) a beam-forming weights determining module configured to determine beam-forming weights based on measurements made by the measuring module, (4) a pre-coding code word creating module configured to create a pre-coding code word comprising the antenna beam forming weights determined by the antenna beam-forming weights determining module, and the pre-coding code book generating module is configured to add to a pre-coding code book the pre-coding code word created by the pre-coding code word creating module.

In another aspect, the invention relates to an improved signal forwarding node (i.e., a node that includes a receiver for receiving a signal and a transmitter for forwarding (i.e., re-transmitting) the received signal). In some embodiments, the signal forwarding node includes: a receiving module configured to receive a signal (e.g., a reference signal) transmitted from a base station; a signal measuring module configured to measure the signal; an antenna beam-forming weight determining module configured to determine antenna beam-forming weights based on one or more measurements of the signal; and a transmitting module for transmitting the beam-forming weights from the signal forwarding node to the base station. In some embodiments, the transmitting module is configured to transmit to the base station a pre-coding code word comprising the antenna beam-forming weights. The signal forwarding node may further include a triggering module configured to trigger the signal measuring module to begin measuring the signal in response to the signal forwarding node receiving a trigger message transmitted from the base station. In other embodiments, the signal forwarding node includes: a signal receiver configured to receive a signal transmitted from a base station; a signal transmitter configured to re-transmit the received the signal; a trigger receiving module operable to receive a trigger transmitted from the base station; and a reference signal transmitter module that is configured to transmit a reference signal to the base station in response to the trigger receiving module receiving the trigger from the base station.

The above and other aspects and embodiments are described below with reference to the accompanying drawings.

DETAILED DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
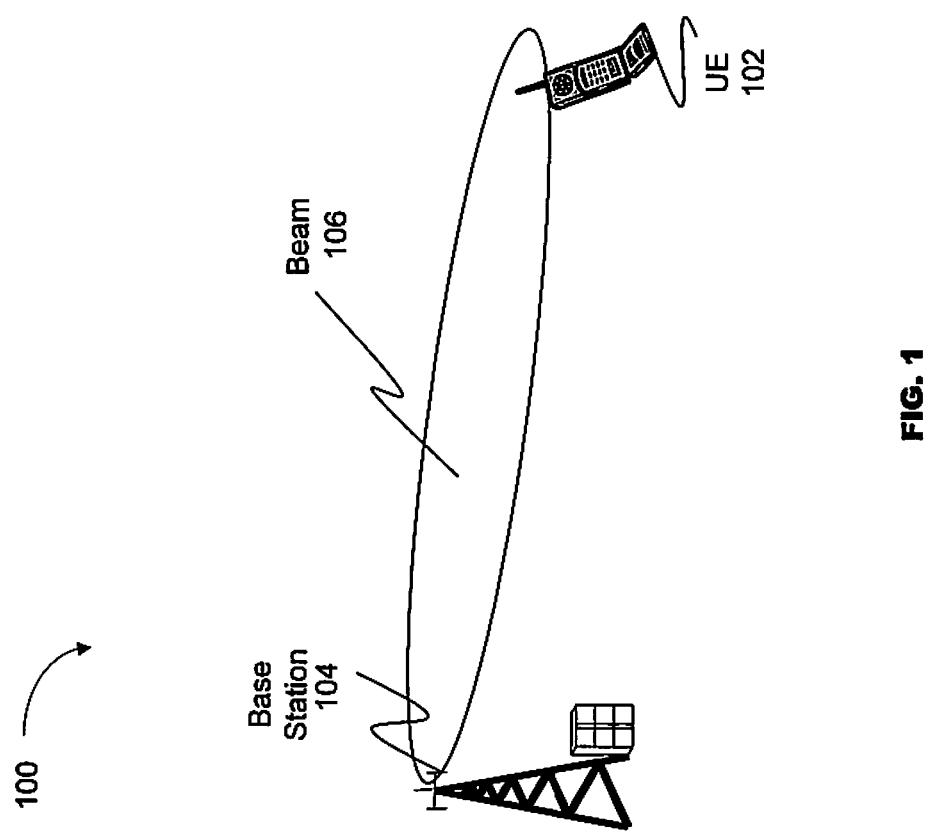
FIG. 1 illustrates a UE communicating with a base station.

Referring to FIG. 1, FIG. 1 illustrates a portion of a radio access system 100. For illustrative purposes, only a single user equipment (UE) 102 and a single base station 104 are shown. Base station 104 may be, for example, an evolved NodeB (eNB). UE 102 and base station 104 may communicate using a beam 106. UE 102 is configured such that, based on measurements of a downlink reference signal transmitted by base station 104, UE 102 selects a suitable pre-coding code word corresponding to beam 106. After selecting the pre-coding code word, UE 102 transmits to base station 104 an identifier associated with the selected pre-coding code word (in LTE, this identifier is referred to as a pre-coding matrix index (PMI)). In response to receiving the PMI from UE 102, base station retrieves from a pre-coding code book the pre-coding code word associated with the received PMI. The pre-coding code book contains a set of one or more pre-coding code words, each of which is associated with a PMI. Each pre-coding code word contains a set of one or more pre-coding vectors. The pre-coding vectors contain antenna beam-forming weights. After obtaining the pre-coding code word identified by the PMI transmitted by UE 102, base station 104 uses the antenna beam-forming weights included in the pre-coding code word to transmit data to UE 102.

Figure 2:
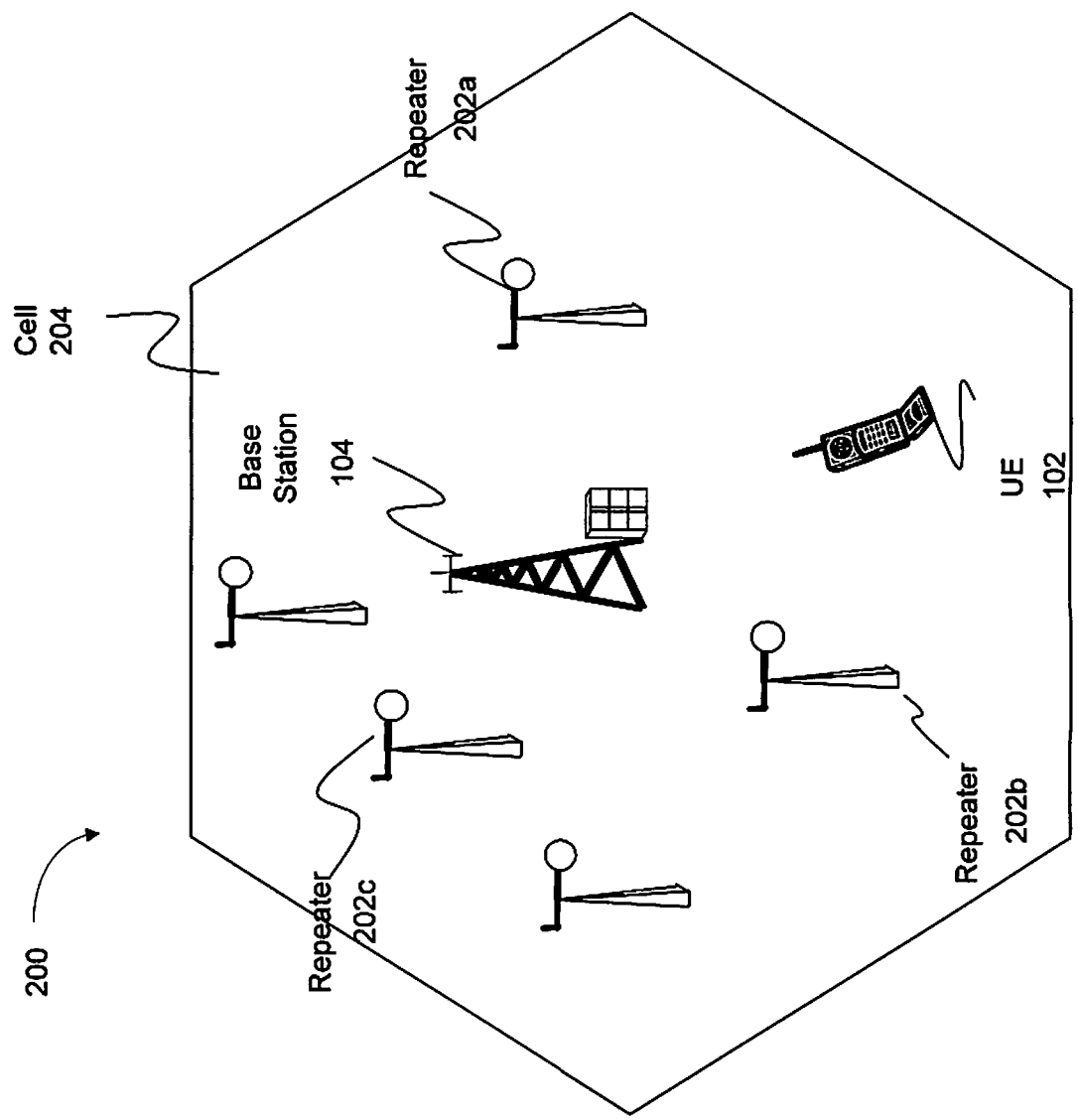
FIG. 2 illustrates a cell of a communication system according to some embodiments of the invention.
Figure 3:
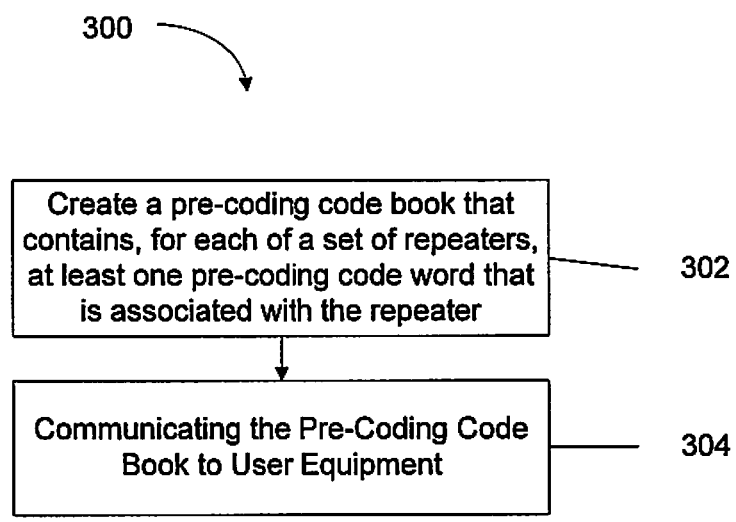
FIG. 3 is a flow chart illustrating a process according to some embodiments of the invention.

Referring to now to FIG. 2, FIG. 2 further illustrates radio access system 100 according to some embodiments of the invention. As illustrated in FIG. 2, base station 104 may provide access services to UEs located in cell 200, and UE 102 and base station 104 may communicate via a set of signal forwarding nodes 202a-202c. Base station 104 is configured to overcome the above described problems by performing process 300 (see FIG. 3). As illustrated in FIG. 3, base station 104 (1) creates a pre-coding code book that contains, for each of a set of signal forwarding nodes 202, at least one pre-coding code word that is associated with the signal forwarding node (step 302) and (2) communicate the pre-coding code book to UE 102 (as well as other UEs in cell 204) (step 304). For example, base station 104 may (1) determine or obtain a pre-coding code word for signal forwarding node 202a, (2) determine or obtain a pre-coding code word for signal forwarding node 202b, and (3) include in a pre-coding code book the pre-coding code word for signal forwarding node 202a and the pre-coding code word for signal forwarding node 202b. The pre-coding code book may contain other pre-coding code words, some of which are associated with other signal forwarding nodes while others are not associated with any signal forwarding node. For instance, the pre-coding code book may include one or more pre-coding code words that are intended for UEs that are not located in the coverage area of any signal forwarding node 202.

The pre-coding code book may determined only once during a system initialization period. Alternatively, base station 104 may modify the pre-coding code book at regular or irregular intervals.

Figure 4:
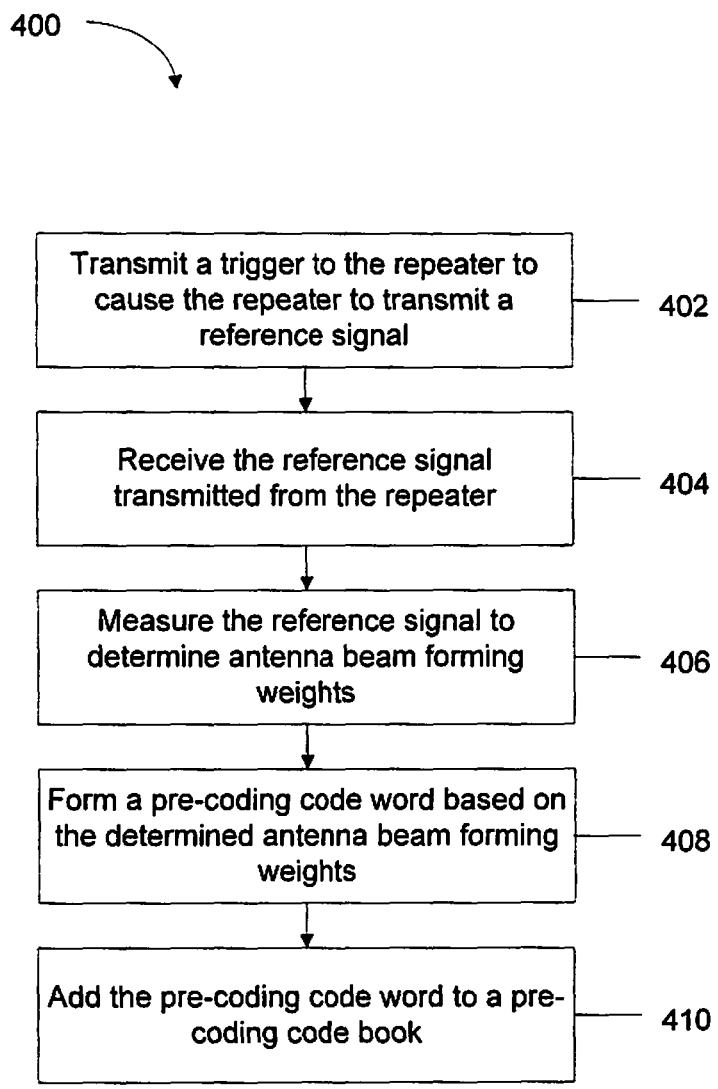
FIG. 4 is a flow chart illustrating a process according to some embodiments of the invention.

Referring now to FIG. 4, FIG. 4 is a flow chart illustrating a process 400, according to some embodiments of the invention, by which base station 104 determines a pre-coding code book. Process 400 may begin in step 402, where a trigger is transmitted to a signal forwarding node 202 (e.g., signal forwarding node 202a) that causes signal forwarding node 202 to transmit a reference signal to base station 104. The reference signal is received by base station 104 in step 404. Base station 104, in step 406, measures the reference signal to determine one or more antenna beam-forming weights. In step 408, base station 104 forms a pre-coding code word that contains the determined antenna beam-forming weights. In step 410, the pre-coding code word is added to a pre-coding code book. Steps 402-410 may be performed for other signal forwarding nodes (e.g., signal forwarding nodes 202b and 202c). In this manner, base station 104 creates pre-coding code book that contains, for each one or more signal forwarding nodes, a pre-coding code word for the signal forwarding node.

Figure 5:
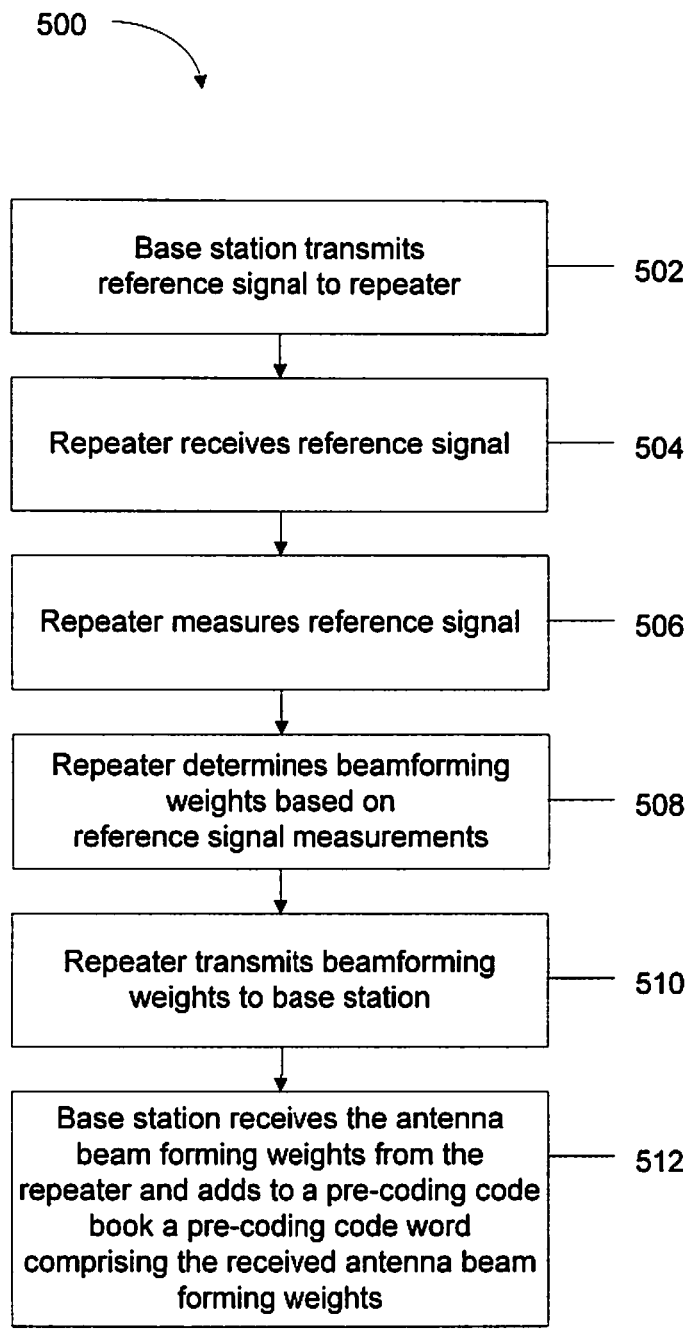
FIG. 5 is a flow chart illustrating a process according to some embodiments of the invention.

Referring now to FIG. 5, FIG. 5 is a flow chart illustrating a process 500, according to other embodiments of the invention, by which base station 104 generates the pre-coding code book. Process 500 may begin in step 502, where base station 104 transmits a reference signal to signal forwarding node 202. Signal forwarding node 202 receives the reference signal in step 504. In step 506, signal forwarding node 202 measures the reference signal. In step 508, signal forwarding node 202 determines antenna beam-forming weights based on measurements of the reference signal. In step 510, signal forwarding node 202 transmits the antenna beam-forming weights to base station 104. For example, in step 510, signal forwarding node transmits to base station 104 a pre-coding code word comprising the determined antenna beam-forming weights. In step 512, base station 104 receives the antenna beam-forming weights and adds to a pre-coding code book a pre-coding code word comprising the received antenna beam-forming weights.

Figure 6:
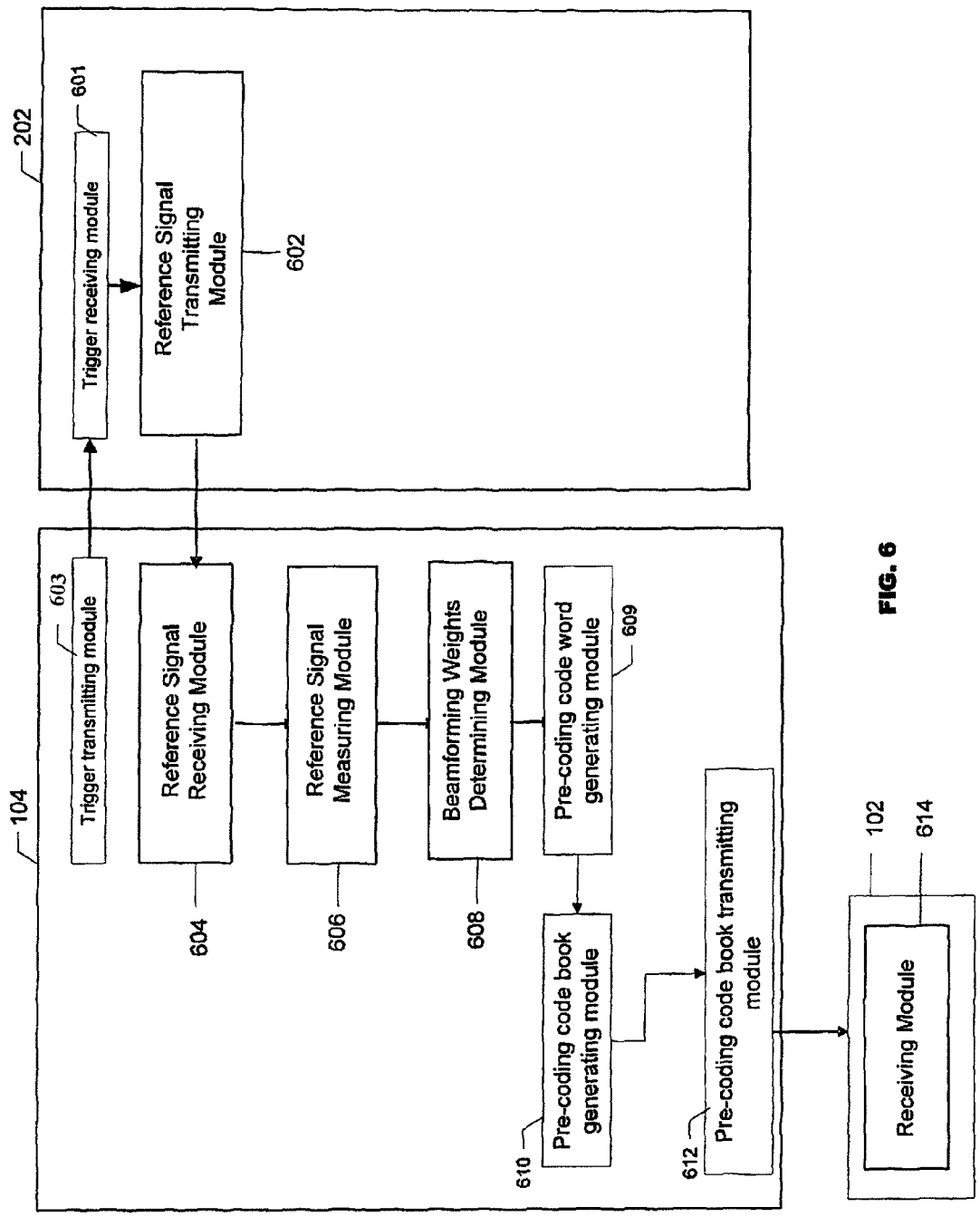
FIG. 6 is a functional block diagram of a base station, signal forwarding node, and user equipment according to some embodiments of the invention.

Referring now to FIG. 6, FIG. 6 is a functional block diagram illustrating components of base station 104, signal forwarding node 202, and UE 102 according to some embodiments. As shown in FIG. 6, signal forwarding node 202 may include: (1) a trigger receiving module 601 for receiving a trigger from a base station 104 and (2) a reference signal transmitting module 602 that is configured to transmit a reference signal to base station 104 (e.g., in response to the trigger receiving module receiving a trigger from base station 104).

Base station 104 may include: (1) a trigger transmitting module 603 for transmitting a trigger to a signal forwarding node 202, (2) a reference signal receiving module 604 for receiving a reference signal from signal forwarding node 202 that is transmitted in response to the trigger, (3) a reference signal measuring module 606 for measuring the reference signal so that antenna beam-forming weights may be determined, (4) an antenna beam-forming weights determining module 608 for determining antenna beamforming weights based on measurements of the reference signal, (5) a pre-coding code word creating module 609 for creating a pre-coding code word that includes the determined antenna beam-forming weights, (6) a pre-coding code book generating module 610 configured to, among other things, add the pre-coding code word to a pre-coding code book, and (7) a communicating module 612 for communicating the pre-coding code book to a UE. The precoding code book may be received by a pre-coding code book receiving module 614 of UE 102. In addition to adding the pre-coding code word to the pre-coding code book, the precoding code book generating module may, as described above, add other pre-coding code words to the pre-coding code book.

Figure 7:
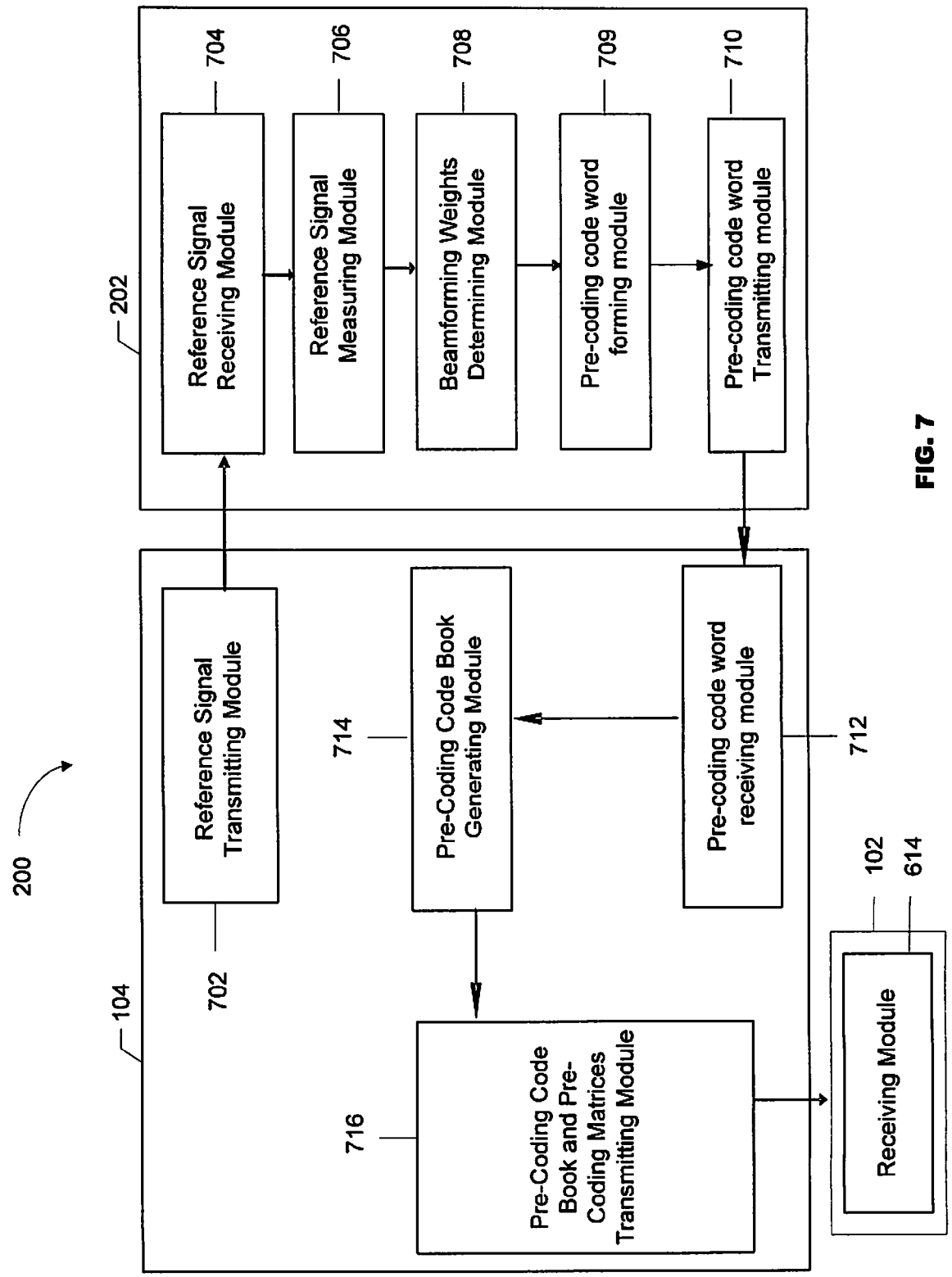
FIG. 7 is a functional block diagram of a base station, signal forwarding node, and user equipment according to some embodiments of the invention.

Referring now to FIG. 7, FIG. 7 is a functional block diagram illustrating components of base station 104, signal forwarding node 202, and UE 102 according to other embodiments. In the embodiment illustrated in FIG. 7, base station 104 includes a reference signal transmitting module 702 for transmitting a reference signal to a signal forwarding node 202, and signal forwarding node 202 includes: (1) a reference signal receiving module 704 for receiving the reference signal transmitted from base station 104, (2) a reference signal measuring module 706 for measuring the reference signal so that antenna beam-forming weights may be determined, (3) an antenna beam-forming weights determining module 708 for determining antenna beam-forming weights based on measurements of the reference signal, (4) a pre-coding code word creating module 709 for creating a pre-coding code word that includes the determined antenna beam-forming weights, and (5) a communicating module 710 for transmitting data (e.g., the pre-coding code word) to base station 104. As further shown in FIG. 7, base station 104 also includes: (1) a receiving module 712 for receiving the data (e.g., the pre-coding code word) transmitted from the signal forwarding node's transmitting module, (2) a pre-coding code book generating module 714 for, among other things, adding to a pre-coding code book a pre-coding code word that comprises the antenna beam-forming weights determined by the determining module 708 (e.g., the pre-coding code word received by receiving module 712), and (3) a communicating module 716 for communicating the pre-coding code book to a UE. The pre-coding code book may be received by a pre-coding code book receiving module 614 of UE 102.

In some embodiments, signal forwarding node does not include module 709. In these embodiments the communicating module 710 communicates the determined antenna beam-forming weights to base station 104, and base station 104 includes a beam-forming weights receiving module for receiving the communicated beam-forming weights and a pre-coding code word forming module that creates a pre-coding code word using the received antenna beam-forming weights.

As discussed above, base station 104 may receive beam-forming weights/pre-coding code words from a plurality of signal forwarding nodes 202a-202c and generate a pre-coding code book based on the beam-forming weights/pre-coding code words received from the signal forwarding nodes 202a-202c. That is, base station 104 may use a pre-coding code book generating module to add the beam-forming weights/pre-coding code words to a pre-coding code book.

Figure 8:
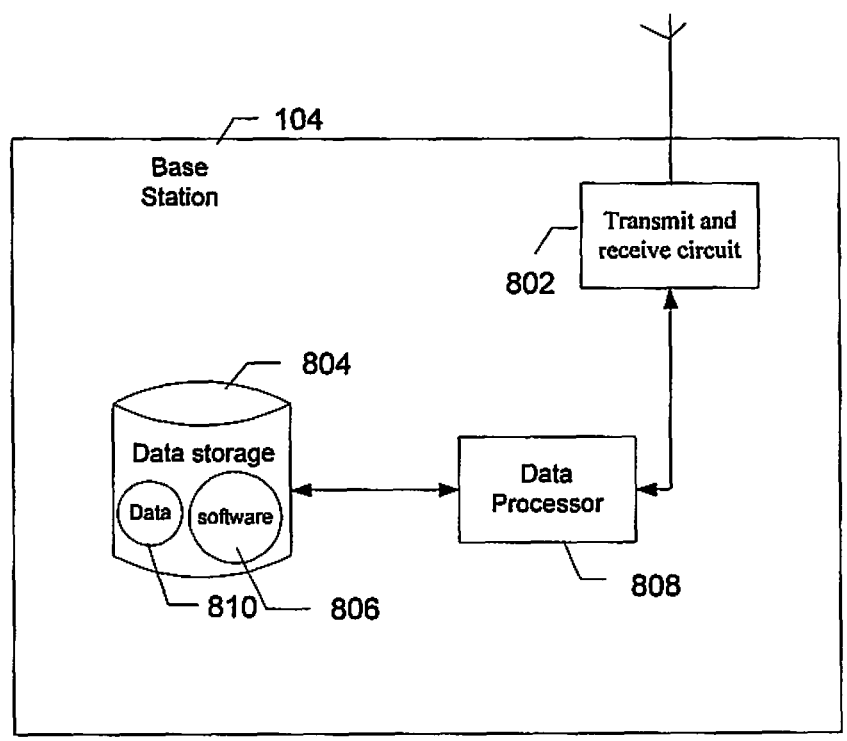
FIG. 8 is a functional block diagram of a base station according to some embodiments of the invention.

Referring now to FIG. 8, FIG. 8 is a functional block diagram illustrating a base station 104 according to some embodiments of the invention. As shown in FIG. 8, base station 104 may include a transmitting and receiving circuit 802 for transmitting data to and receiving data from user equipment; a storage unit 804 (e.g., a non-volatile data storage) that stores software 806 for implementing the functions and features described above; and a processor 808 (e.g., a microprocessor) for executing software 806. Storage unit 804 may also store data 810 relating to the use of base station 104.

Figure 9:
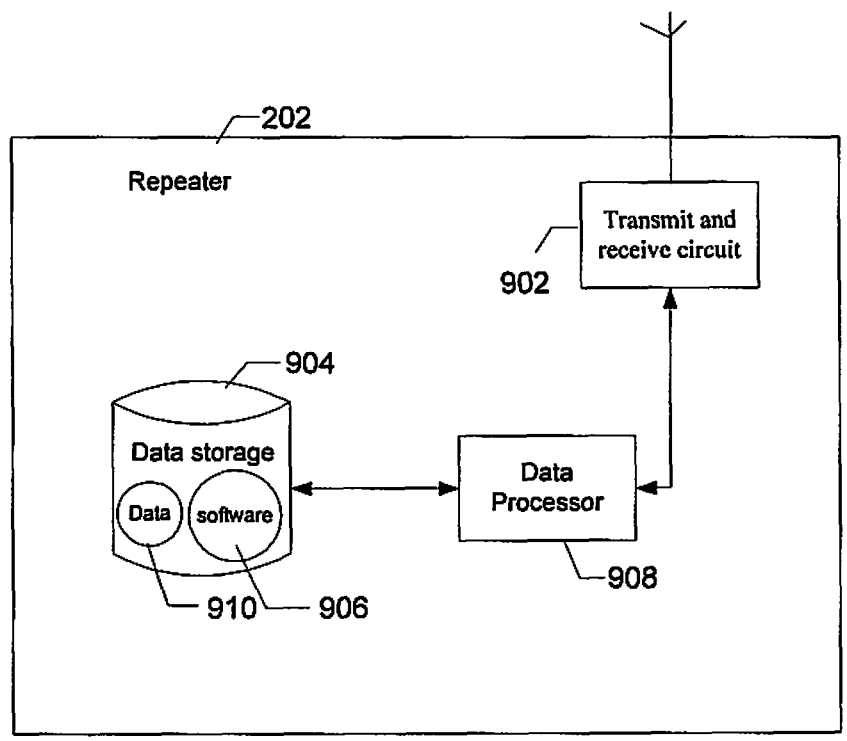
FIG. 9 is another functional block diagram of a signal forwarding node according to some embodiments of the invention.

Referring now to FIG. 9, FIG. 9 is a functional block diagram illustrating a signal forwarding node 202 according to some embodiments of the invention. As shown in FIG. 9, signal forwarding node 202 may include a transmitting and receiving circuit 902 for transmitting data to and receiving data from UE 102/base station 104; a storage unit 904 (e.g., a non-volatile data storage) that stores software 906 for implementing the functions and features described above; and a processor 908 (e.g., a microprocessor) for executing software 906. Storage unit 904 may also store data 910 relating to use of signal forwarding node 202.

Aspects and embodiments of the invention may provide one or more advantages. For example, embodiments where the pre-coding code book is generated by a base station based on measurements of a reference signal transmitted from the base station to a signal forwarding node and/or measurements of a reference signal transmitted from the signal forwarding node to the base station can ensure good channel condition between the base station and the signal forwarding node. Additionally, such embodiments enable the easy introduction of a signal forwarding node in an existing network or require only a small upgrade with low complexity/cost. For example, no signaling is needed between a UE and the signal forwarding node. Also, if a UE is informed of candidate pre-coding code words by the common RS antenna ports, there is no change of UE behavior at all.

While various embodiments of the present invention have been described above, it should be understood that they have been presented by way of example only, and not limitation. Thus, the breadth and scope of the present invention should not be limited by any of the above described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

Examples E1 to E19 of embodiments relating to the invention are as follows:

E1: A base station (104), comprising:
- a pre-coding code book generating module (610) configured to generate a pre-coding code book, wherein the pre-coding code book comprises at least one pre-coding code word associated with a signal forwarding node (202a), and the pre-coding code word comprises one or more antenna beam-forming weights; and
- a pre-coding code book communicating module (612) configured to communicate the pre-coding code book from the base station to a mobile station.

E2: The base station of Example E1, further comprising a reference signal transmitting module (702) configured to transmit a reference signal to a signal forwarding node (202).

E3: The base station of Example E2, further comprising a receiving module (712), the receiving module being operable to receive from the signal forwarding node antenna beam-forming weights.

E4: The base station of Example E3, wherein the pre-coding code book generating module is configured to add antenna beam-forming weights received by the receiving module to a pre-coding code book.

E5: The base station of Example E3, further comprising a pre-coding code word forming module (709) configured to form a pre-coding code word comprising antenna beam-forming weights received by the receiving module.

E6: The base station of Example E5, wherein the pre-coding code book generating module is configured to add pre-coding code words formed by the pre-coding code word forming module to a pre-coding code book.

E7: The base station of Example E1, further comprising a trigger transmitting module (601) configured to transmit a trigger to the signal forwarding node, wherein the trigger triggers the signal forwarding node to transmit a reference signal.

E8: The base station of Example E1 or Example E7, further comprising a measuring module (606) configured to measure a reference signal transmitted by the signal forwarding node.

E9: The base station of Example E8, further comprising a beam-forming weights determining module (608) configured to determine beam-forming weights based on measurements made by the measuring module.

E10: The base station of Example E9, further comprising a pre-coding code word creating module (609) configured to create a pre-coding code word comprising the antenna beam forming weights determined by the antenna beam-forming weights determining module.

E11: The base station of Example E10, wherein the pre-coding code book generating module is configured to add to a pre-coding code book the pre-coding code word created by the pre-coding code word creating module.

E12: The base station of any of Examples E1-E11, wherein the pre-coding code book generating module is configured to generate a pre-coding code book periodically.

E13: The base station of any of Examples E1-E12, wherein the pre-coding code book generating module is configured to generate the pre-coding code book only during any one of a system initialization period and a new user set-up procedure.

E14: The base station of any of Examples E1-E13, wherein the pre-coding code book communicating module is configured to communicate a pre-coding code book size to the user equipment using a common control channel and using a candidate pre-coding code words as weights of common reference signals.

E15: A signal forwarding node (202), comprising:
- a receiving module (704) configured to receive a signal transmitted from a base station;
- a signal measuring module (706) configured to measure the signal;
- an antenna beam-forming weight determining module (708) configured to determine antenna beam-forming weights based on one or more measurements of the signal; and
- a transmitting module (710) for transmitting the beam-forming weights from the signal forwarding node to the base station.

E16: The signal forwarding node of Example E15, wherein the transmitting module is configured to transmit to the base station a pre-coding code word comprising the antenna beam-forming weights.

E17: The signal forwarding node of any one of Examples E15-E16, wherein the signal is a reference signal.

E18: The signal forwarding node of any one of Examples E15-E17, further comprising a triggering module (601) configured to trigger the signal measuring module to begin measuring the signal in response to the signal forwarding node receiving a trigger message transmitted from the base station.

E19: A signal forwarding node (202), comprising:
- a signal receiver (902) configured to receive a signal transmitted from a base station;
- a signal transmitter (902) configured to re-transmit the received the signal;
- a trigger receiving module (601) operable to receive a trigger transmitted from the base station; and a reference signal transmitter module (602) that is configured to transmit a reference signal to the base station in response to the trigger receiving module receiving the trigger from the base station.

The invention claimed is:

1. A method in a network node for determining a pre-coding code book for multiple antenna transmission, the network node comprised in a network, the network further comprising a signal forwarding node, the method comprising:
   generating a pre-coding code book that comprises at least one pre-coding code word associated with the signal forwarding node, the at least one pre-coding code word comprising one or more antenna beam-forming weights; and
   communicating the pre-coding code book to a user equipment;
wherein the signal forwarding node is newly added to the network and wherein generating a pre-coding code book that comprises at least one pre-coding code word associated with the signal forwarding node comprises adding the at least one pre-coding code word to a pre-determined pre-coding code book.

2. The method of claim 1, wherein the signal forwarding node is added after the pre-determined pre-coding code book is determined and the pre-determined pre-coding code book does not include a code word associated with the signal forwarding node.

3. The method of claim 2, wherein generating the pre-coding code book comprises generating the at least one pre-coding code word associated with the signal forwarding node and including the at least one pre-coding code word in the pre-coding code book.

4. The method of claim 3, wherein generating the at least one pre-coding code-word further comprises receiving at the network node a reference signal transmitted from the signal forwarding node.

5. The method of claim 4, wherein generating the at least one pre-coding code word further comprises measuring the reference signal.

6. The method of claim 5, further comprising determining said one or more antenna beam-forming weights based on measurements of the reference signal.

7. The method of claim 6, further comprising forming the at least one pre-coding code word to comprise the determined one or more antenna beam-forming weights and including said pre-coding code word in the pre-coding code book.

8. The method of claim 7, further comprising transmitting to the signal forwarding node a trigger message that causes the signal forwarding node to transmit the reference signal.

9. The method of claim 2, further comprising transmitting a reference signal to the signal forwarding node.

10. The method of claim 9, further comprising receiving said one or more antenna beam-forming weights from the signal forwarding node and adding the at least one pre-coding code word, comprising the received one or more antenna beam-forming weights, to the pre-coding code book.

11. The method of claim 10, wherein receiving the one or more antenna beam-forming weights comprises receiving the at least one pre-coding code word from the signal forwarding node, the at least one pre-coding code word comprising the one or more antenna beam-forming weights.

12. The method of claim 2, wherein said generating step is performed periodically.

13. The method of claim 12, wherein said generating step is performed periodically at an interval set by the network node.

14. The method of claim 2, wherein said generating step is performed only during any one of a system initialization period and a new user set-up procedure.

15. The method of claim 2, wherein said communicating comprises communicating a pre-coding code book size to the user equipment using a common control channel and using candidate pre-coding vectors as weights of common reference signals.

16. The method of claim 2, further comprising optimizing the pre-coding code book using any one of a dirty-paper coding algorithm and sub-optimal pre-coding algorithm.

17. The method of claim 2, wherein:

generating the pre-coding code book comprises updating a pre-coding code book, the network node comprises a base station, and the signal forwarding node comprises a repeater or relay.

18. A base station, comprising:

a processor and a memory, said memory containing instructions executable by the processor whereby the base station is configured to:

generate a pre-coding code book that comprises at least one pre-coding code word associated with a signal forwarding node, the at least one pre-coding code word comprising one or more antenna beam-forming weights, wherein the signal forwarding node is newly added to the network and wherein generating a pre-coding code book that comprises at least one pre-coding code word associated with the signal forwarding node comprises adding the at least one pre-coding code word to a pre-determined pre-coding code book; and communicate the pre-coding code book from the base station to a mobile station.

19. The base station of claim 18, wherein the signal forwarding node is added after the pre-determined pre-coding code book is determined and the pre-determined pre-coding code book does not include a code word associated with the signal forwarding node.

* * * * *